(12) United States Patent
Gorti et al.

(10) Patent No.: US 6,862,730 B1
(45) Date of Patent: Mar. 1, 2005

(54) REGISTER ALLOCATION IN CODE TRANSLATION BETWEEN PROCESSORS

(75) Inventors: Sri Ram Gorti, Karnataka (IN); Srinivas Kantheti, Karnataka (IN)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/558,542

(22) Filed: Apr. 26, 2000

(51) Int. Cl.[7] .............................. G06F 9/45; G06F 9/00
(52) U.S. Cl. .................. 717/159; 717/153; 717/158; 712/228
(58) Field of Search ...................... 717/159, 153, 717/158; 712/228

(56) References Cited

U.S. PATENT DOCUMENTS

| | | | | |
|---|---|---|---|---|
| 5,261,062 A | * | 11/1993 | Sato | 717/153 |
| 5,287,510 A | * | 2/1994 | Hall et al. | 717/160 |
| 5,301,325 A | * | 4/1994 | Benson | 717/159 |
| 5,313,614 A | * | 5/1994 | Goettelmann et al. | 717/138 |
| 5,526,499 A | * | 6/1996 | Bernstein et al. | 712/216 |
| 5,551,015 A | * | 8/1996 | Goettelmann et al. | 717/137 |
| 5,560,013 A | * | 9/1996 | Scalzi et al. | 717/138 |
| 5,577,231 A | * | 11/1996 | Scalzi et al. | 703/26 |
| 5,577,233 A | * | 11/1996 | Goettelmann et al. | 703/26 |
| 5,724,590 A | * | 3/1998 | Goettelmann et al. | 717/154 |
| 5,768,595 A | * | 6/1998 | Gillies | 717/159 |
| 5,835,775 A | * | 11/1998 | Washington et al. | 717/153 |
| 5,836,014 A | * | 11/1998 | Faiman, Jr. | 717/159 |
| 5,857,103 A | * | 1/1999 | Grove | 717/146 |
| 5,870,597 A | * | 2/1999 | Panwar et al. | 712/230 |
| 5,875,318 A | * | 2/1999 | Langford | 717/145 |
| 5,966,536 A | * | 10/1999 | Ravichandran | 717/153 |
| 6,035,120 A | * | 3/2000 | Ravichandran | 717/141 |
| 6,075,942 A | * | 6/2000 | Cartwright, Jr. | 717/138 |
| 6,253,373 B1 | * | 6/2001 | Peri | 717/158 |
| 6,286,135 B1 | * | 9/2001 | Santhanam | 717/151 |
| 6,356,918 B1 | * | 3/2002 | Chuang et al. | 707/203 |
| 6,463,582 B1 | * | 10/2002 | Lethin et al. | 717/158 |
| 6,477,641 B2 | * | 11/2002 | Davis et al. | 717/150 |

* cited by examiner

*Primary Examiner*—Kakali Chaki
*Assistant Examiner*—Qamrun Nahar (57) ABSTRACT

This invention provides a low level code translation technique that separates a source code into blocks based on a target processor register capability. The source code of a source processor, is first divided into source code blocks based on instruction sequence altering commands such as branch or loop commands. Each of the source code blocks may be further divided into translated code blocks based on the target register capability. A head stub and a tail stub that perform housekeeping tasks are added to each of the translated code block to form translated blocks. The head stubs retrieve source register values from a source register map to initialize target registers and the tail stubs store values of the target registers into the source register map so that the register map contains the most current values of the source registers.

18 Claims, 14 Drawing Sheets

REGISTER ALLOCATION IN CODE TRANSLATION BETWEEN PROCESSORS

BACKGROUND OF THE INVENTION

1. Field of Invention

This invention relates to register allocation in code translation between processors.

2. Description of Related Art

Unlike high level languages, low level code such as assembly language is highly dependent on the register resources of the underlying processor. When translating low level code of a first processor to low level code of a second processor, the differences between the number of registers between the first and second processors must be considered. New technology is needed to perform code translations between different processors that produce efficient translated code.

SUMMARY OF THE INVENTION

This invention provides a low level code translation technique that separates a source code into blocks based on a target processor register capability. The source code of a source processor, is first divided into source code blocks based on instruction sequence altering commands such as branch or loop commands. Each of the source code blocks are then analyzed to determine register usage associated with each of the instructions of the source code block. The registers are classified according to types based on the target processor register capability. The target register capability is determined based on the number of registers of the target processors that may perform functions of the various types of registers of the source processor.

A maximum number of target processor registers that may be used for each type of source processor registers is determined. One or more of the source processor register types may be selected and the source code blocks may be further divided into translated code blocks based on the maximum numbers corresponding to the selected source register types.

A head stub and a tail stub are added to each of the translated code block to form translated blocks. The head and tail stubs perform housekeeping tasks to support execution of the translated code blocks. The head stubs retrieve source register values from a source register map to initialize target registers of the target processors. The tail stubs store values of the target registers into the source register map so that the source register map contains the most current values of the source registers during execution of the translated code.

The source register map may be further enhanced to account for delay times between execution of source instructions that include register update commands and the time when the register is updated to the new value. Such delays may be accounted for by increasing the number of storage locations for each register corresponding to a delay time required for the execution of an instruction that updates the corresponding register.

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Figure 1:
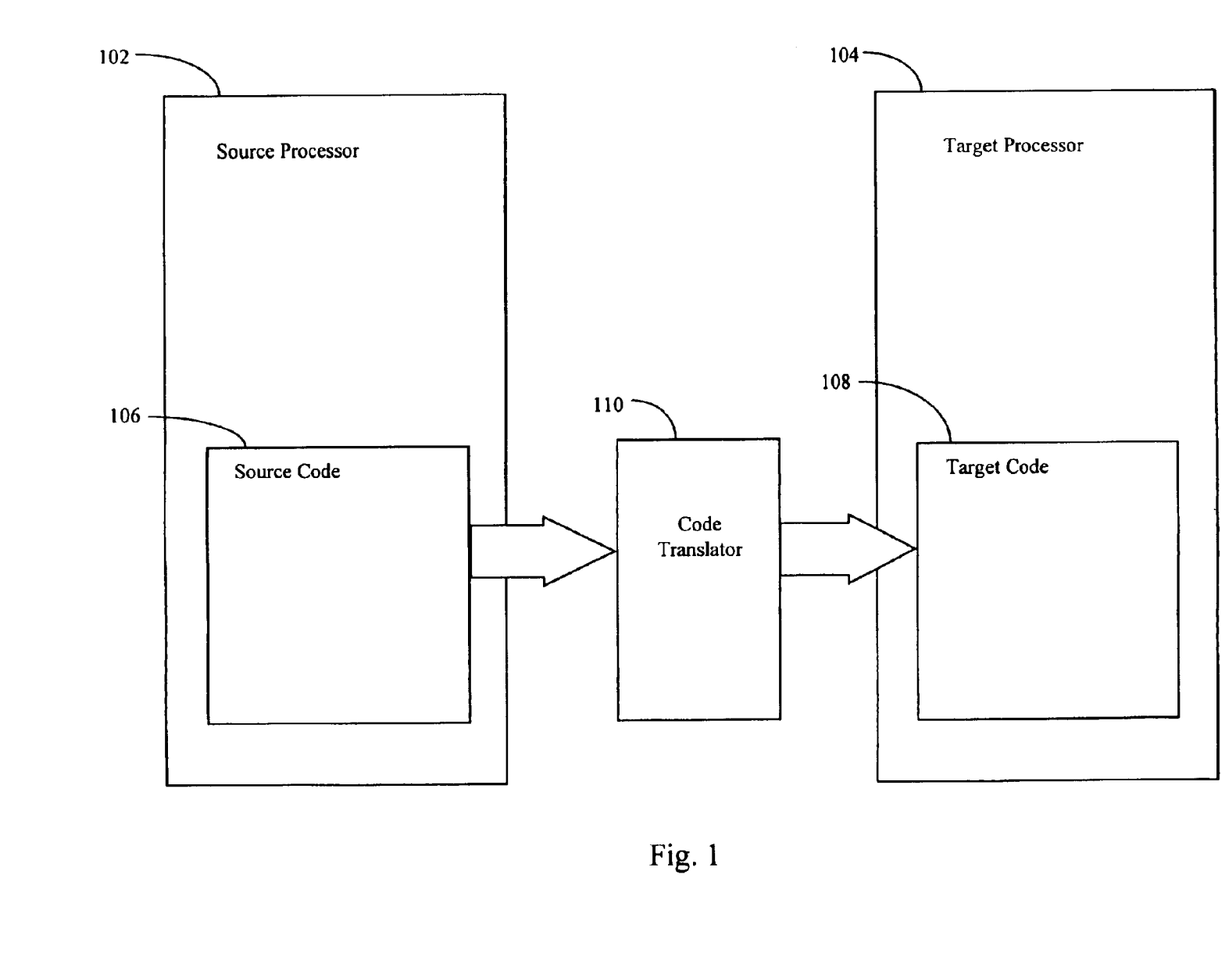
FIG. 1 shows a functional diagram of a code translator.

FIG. 1 shows a block diagram of a code translator 110 that translates low level source code 106 of a source processor 102 into a low level target code 108 of a target processor 104. Unlike high level lanaguage code, low level code such as assembly language code, by their inherent characteristics, are very processor dependent. Thus, in order to translate the source code 106 to the target code 108, the code translator must identify registers of the source processor 102 used by the source code 106 and corresponding registers in the target processor 104 that may be used by the target code 108.

Figure 2:
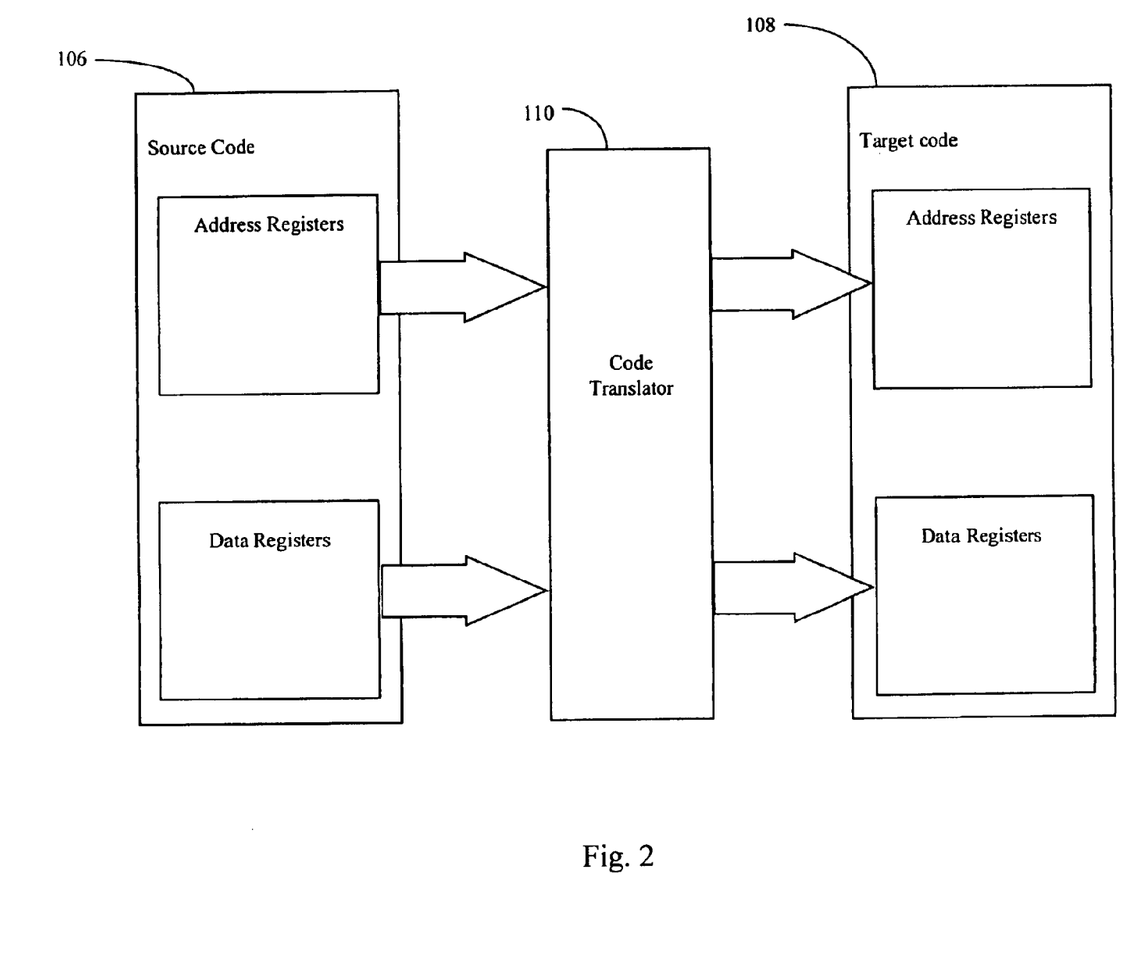
FIG. 2 shows two types of registers translated by the code translator.

FIG. 2 shows a block diagram showing address registers and data registers of the source processor 102 used by the source code 106 that may be translated into address and data registers of the target processor 104 to be used by the target code 108. The address registers include those registers that may be used as pointers to retrieve data from mass storage, to retrieve coefficients from specialized hardware memory such as ROM, or to retrieve information from fast memory devices such as general purpose registers, for example. Usually, address registers are associated with a control portion of the source code. Some address registers may also be used to support data flow processes such as supplying coefficients to multipliers, for example. Data registers are usually associated with data flow processes and may include those registers that are used for manipulating data such as input and output registers for adders and multipliers, for example.

A general problem in low level code translation is a mismatch of the number of registers of a particular type between the source processor 102 and target processor 104. If the number of registers in the source processor 102 is less than a corresponding number of registers (that may be used to perform the same function in the target code 108) in the target processor 104, then the translation task may simply make assignments and translate the source code accordingly. However, if the number of registers in the source processor 102 is greater than the number of corresponding registers in the target processor 104, then the code translator 110 may be required to use the registers in the target processor 104 for multiple purposes. In such a situation, the code translation process must account for the target register capability for each type of source registers. This invention accounts for the target register capability by a source code blocking technique that divides the source code into blocks based on a number of registers used by each of the blocks.

Figure 3:
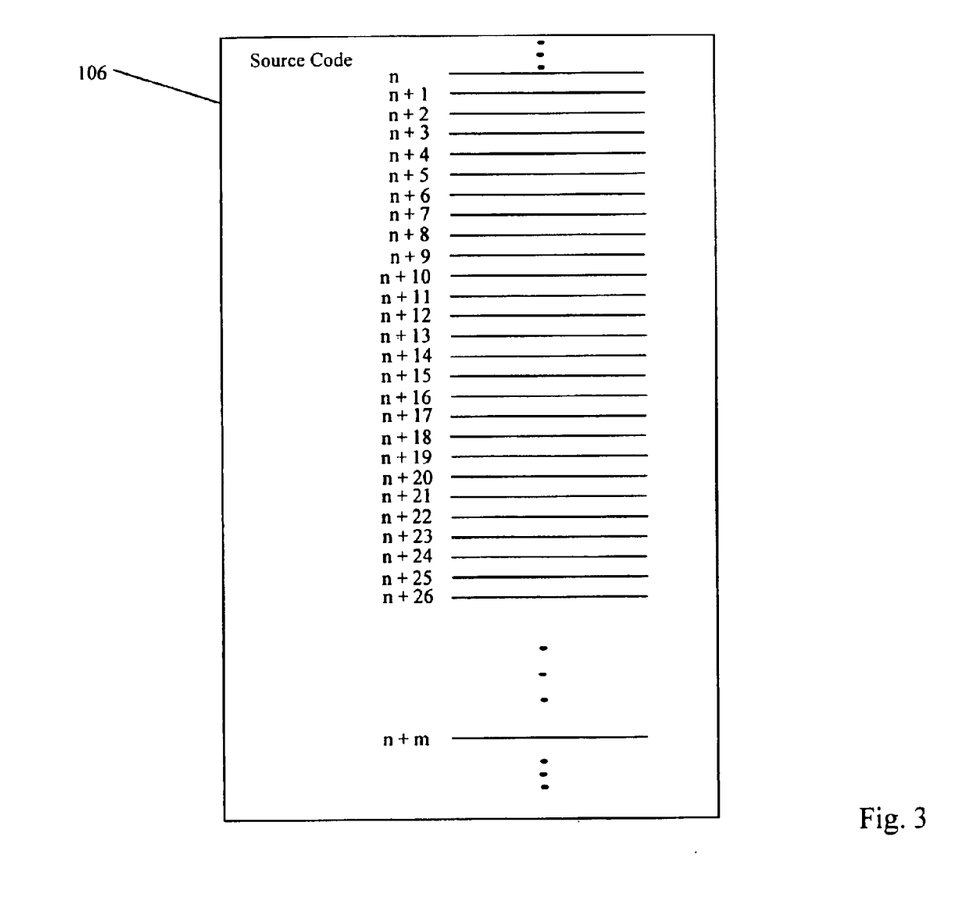
FIG. 3 shows an exemplary source code.

For example, FIG. 3 shows an exemplary diagram of a portion of the source code 106 that includes instructions numbered as n, n+1, . . . n+m where n and m are positive integers. Each instruction is represented by a horizontal line placed next to the instruction number. The instructions may include various commands that may change the instruction sequence data-dependently such as branch or looping commands, for example. Thus, the source code 106 may be fist divided into source code blocks based on such branch and loop commands.

Figure 4:
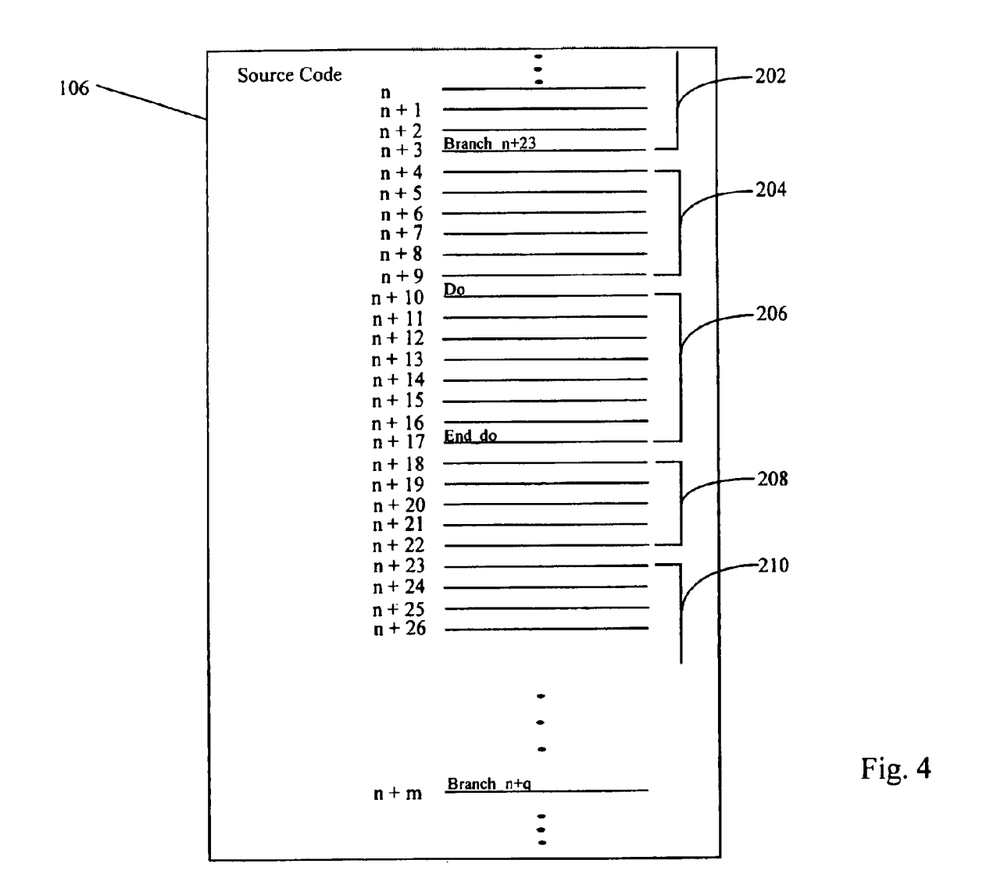
FIG. 4 shows the source code of FIG. 3 divided into blocks based on branch and loop commands.

FIG. 4 shows examples of such branch and loop commands. Instruction n+3 includes a branch command that alters the instruction sequence to continue at n+23 instead of instructions n+4. Instruction n+10 is the beginning of a "do-loop" and instruction n+7 is the end of the "do-loop". Thus, based on the above example branch and loop commands, the source code 106 may be divided into source code blocks 202–210 where each source code block spans instructions from immediately after a branch or loop command to an instruction that includes a next branch or loop command. Thus, the source code block 202 begins at an instruction above instruction n and ends at instruction n+3 which includes the branch command to instruction n+23. The source code block 204 begins at instruction n+4 and ends at instruction n+9. The source code block 206 begins at instruction n+10 and ends at instruction n+17 which includes a complete "do-loop" beginning with the "do" instruction and ending with the "end do" instruction. The source code block 208 begins at instruction n+18 and ends at instruction n+22; and the source code block 210 begins at instruction n+23 and ends at instruction n+m which has a branch instruction to n+q where q is greater than n, for example. The source code block 208 stops at instruction n+22 because instruction n+23 is an entry point for the branch command of instruction n+3. While the above uses branches and loops as examples, other types of commands that direct execution flow may be used. For example, multiple destination branch, if-then-else, etc. may also be included as is well known in the art.

After dividing the source code 106 into source code blocks 202–210 based on branches and loops, each of the source code blocks 202–210 may be examined to determine a number of source registers that may be required to support a particular source code block 202–210. For example, if the source processor 102 includes 16 registers of interest and the target processor 104 only includes four corresponding registers (that may be used to perform the required corresponding functions performed by the 16 registers of the source processor 102), then each source code block 202–210 must be subdivided into translated code blocks where each of the translated code blocks uses a number of target processor registers less than or equal to four. Thus, the target register capability in this case is four and four is set as a maximum number of target processor registers allowed.

Figure 5:
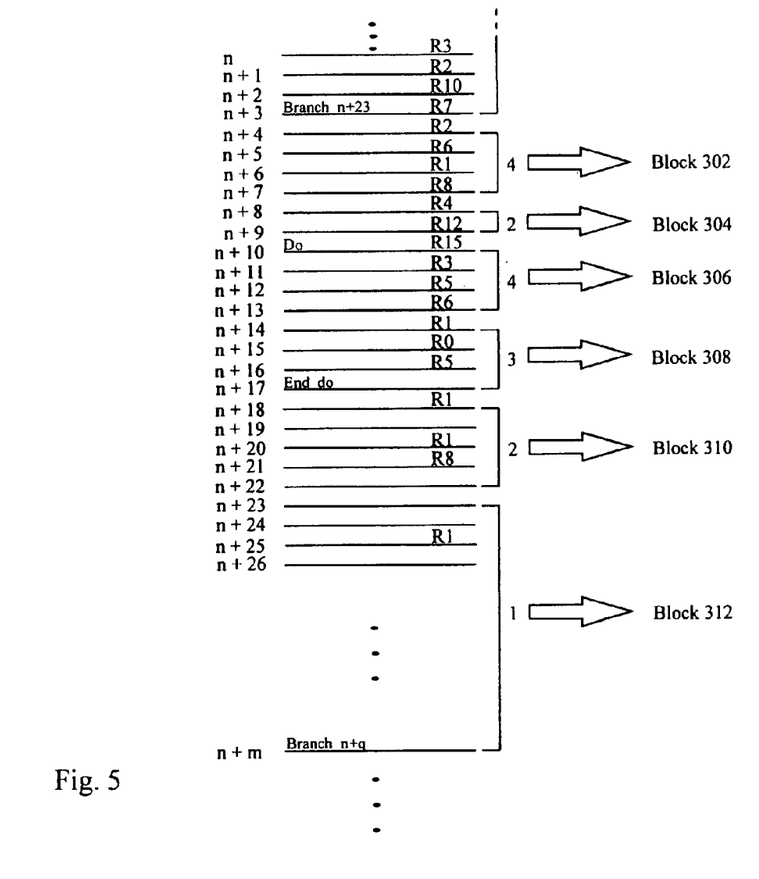
FIG. 5 shows the source code divided into translated code blocks based on a number of registers required for each block.

FIG. 5 shows an example register usage of the instructions n to n+m in the source code 106. Instruction n uses register R3, instruction n+1 uses register R2, instruction n+2 uses register R10, and so on. Instructions n+17, n+19, n+22-n+24 and n+26-n+m do not use registers. Starting with the source code block 204, the source code 106 uses four registers between n+4 and n+7. Thus, instructions n+4 to n+7 are blocked together into a translated code block 302. Instructions n+8 and n+9 are blocked together as translated code block 304 even though only two registers are used, because instruction n+10 is the beginning of a do-loop and more instructions cannot be included in the translated code block 304 with instructions n+8 and n+9. Thus, translated code block 304 only includes instructions n+8 and n+9.

While the do-loop begins at instruction n+10 and ends at instruction n+17, the complete do-loop requires seven registers and cannot be blocked together in one translated code block. Thus, the do-loop is divided into two translated code blocks 306 and 308 where the translated code block 306 requires four registers and translated code block 308 requires three registers. Instructions n+18 to n+22 require only two registers (the register R1 is used twice). Thus, instructions n+18 to n+22 are grouped into one translated code block 310. Instructions n+23 to n+m require only a single register R1. Thus, the instructions n+24 to n+m are grouped together into a translated code block 312. The above description assumes that only one type of source registers is used to steer the generation of translated code blocks. However, multiple types of source registers may be identified and the translation process must account for all the identified source register types. The translation process may select one or more of the identified source register types to control the blocking of translated code blocks.

For example, if two source register types are selected, then a maximum number of each type of registers may be determined. Then, a translated code block is limited to a number of instructions that use less than or equal to the maximum number of registers of each of the selected types.

Figure 6:
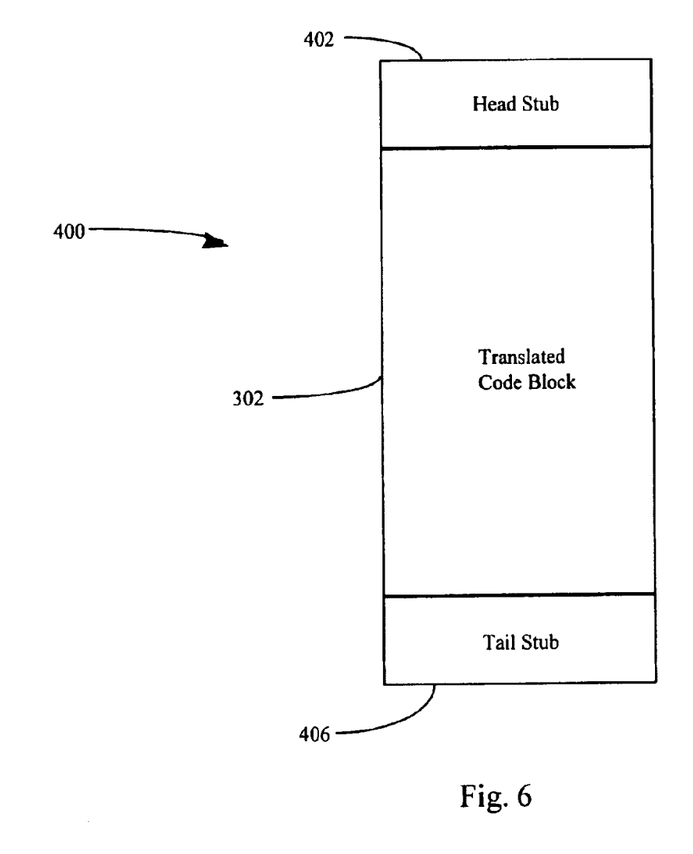
FIG. 6 shows an exemplary diagram of a translated code block.
Figure 7:
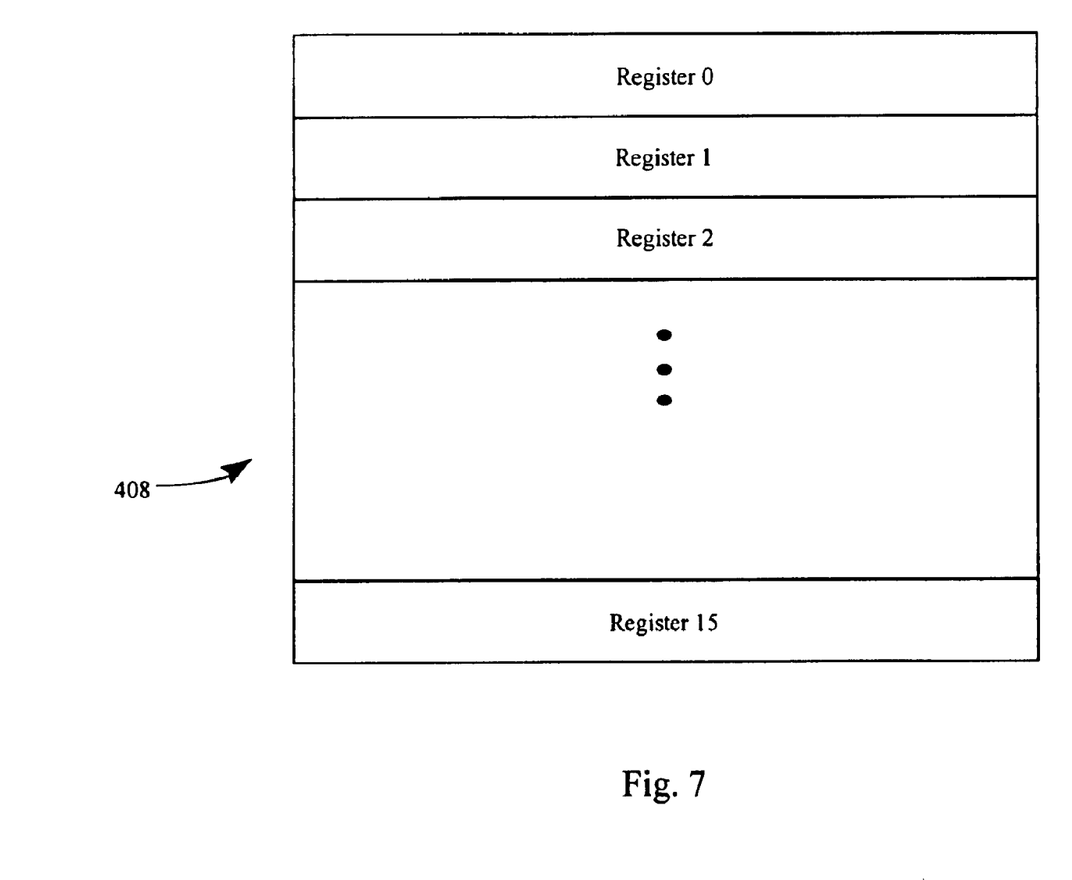
FIG. 7 shows an exemplary register map that may be used by the translated code block.

FIG. 6 shows an exemplary diagram of a translated block 400. The translated block 400 includes a head stub 402, the translated code block 302 and a tail stub 406. The head and tail stubs 402 and 406 may perform housekeeping tasks such as initializing the target processor's registers (target registers) based on current values of those registers as processed by prior translated blocks 400. For example, the code translator 110 may create a source processor register map 408 in memory of the target processor 104 as shown in FIG. 7. Such a source register map 408 may allocate 16 locations in memory to store the current register values (16 registers are assumed) of the source processor 102. As each translated block 400 is executed, the head stub 402 retrieves, from the source register map 408, the needed values for the target registers and loads the values in the assigned target registers of the target processor 104. After the values of the target registers have been initialized, the translated code block 302 may begin execution. When the translated code block 302 completes its execution, the tail stub 406 may update the source register map 408 with ending values of the target registers so that the source register map 408 may always reflect the most current values of the source registers after execution of each translated code block 302–312.

The source register map 408 may need to be enhanced if there are delays between the time an instruction is executed in the source processor 102 and the time that the source register value is updated. For example, in pipeline processors, instructions are often executed over two or more cycles of the processor. Assuming that a two cycle delay is needed, then the time between an instruction execution and output of results of the execution may be separated by two instruction cycles.

For example, in FIG. 5, assuming that register R8 is updated and updating the register R8 in instruction n+7 requires two cycles, then a new value of R8 is not available until the time instruction n+9 is executed. Thus, in the source processor 102, the register R8 may retain the original value until instruction n+9. In fact, if instructions n+7 to n+9 also update the register R8, the value of the register R8 may change every instruction cycle between instructions n+9 to n+11, but the value updates are always the result of the execution of instructions two cycles earlier.

In the example shown in FIG. 5, the instruction n+9 is part of translated code block 304 while instruction n+7 is part of translated code block 302. Thus, in order to replicate the timing for updating the register R8, the source register map 408 may be enhanced to store multiple values for each of the registers corresponding to respective delay times resulting from multiple instruction cycles between the instruction execution and when the new value of the register is loaded into the register.

Figure 8:
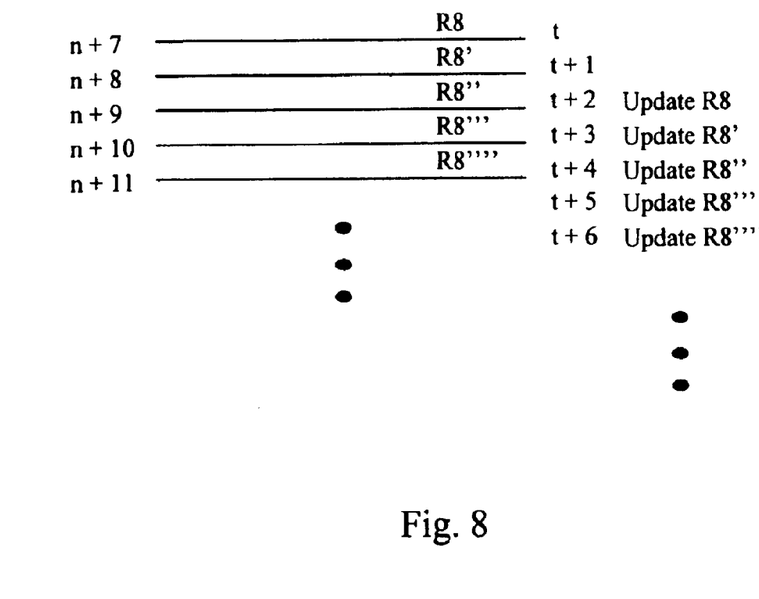
FIG. 8 shows an exemplary diagram of delay associated with instructions.

FIG. 8 shows an example of register R8 being updated by instructions n+7 to n+11 indicated by R8, R8', R8", R8'" and R8"". Assuming a two cycle delay, R8 is updated starting at t+2 to t+6. Thus, if a new R8 value may be used as soon as it is updated, then the instruction n+9 uses the value of "update R8" generated by the instruction n+7 and instructions n+10 uses the value of "update R8'"generated by instructions n+8 and so on.

Figure 9:
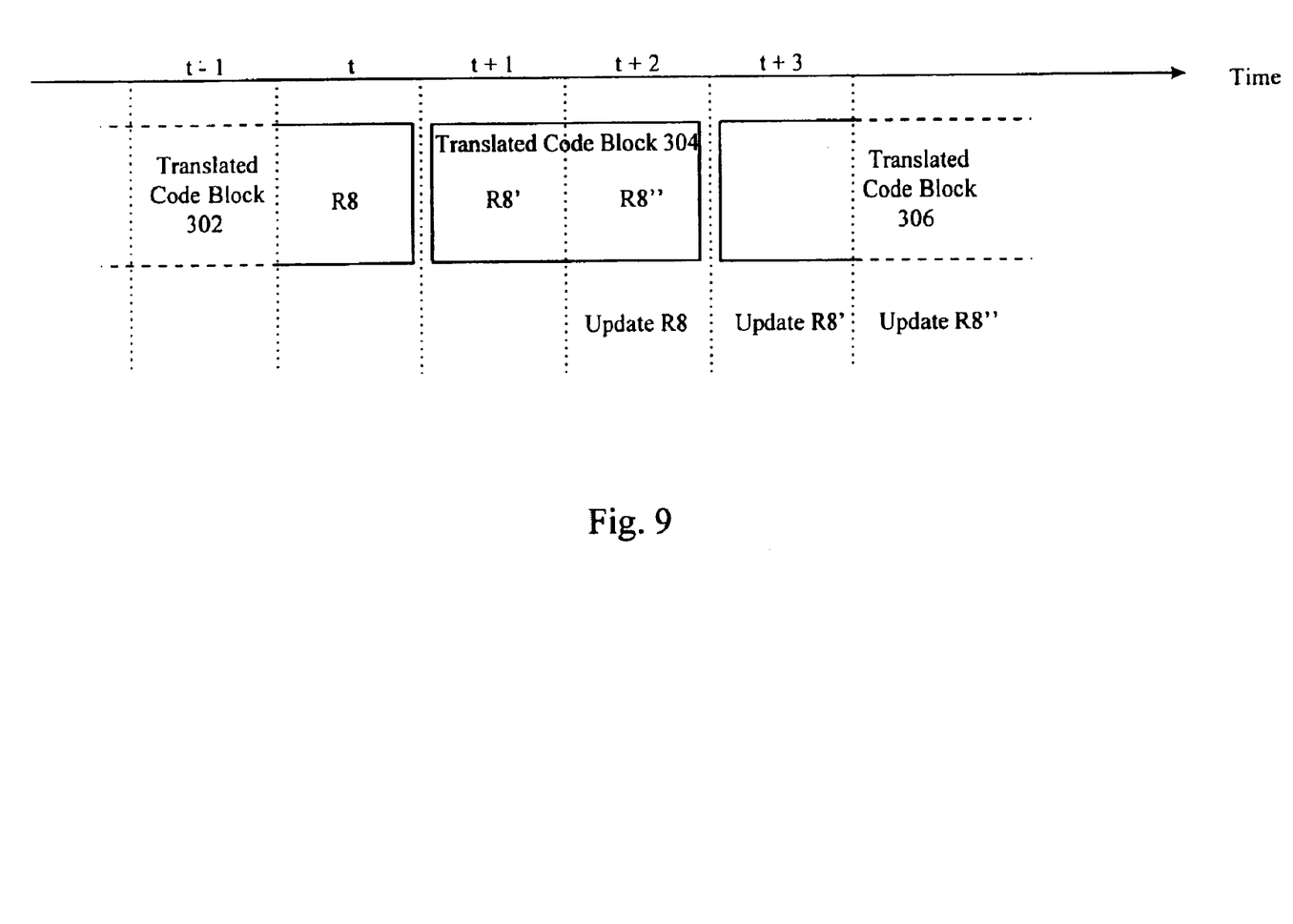
FIG. 9 shows instruction execution delay from translated code block perspective.

FIG. 9 shows register R8 update timing from a translated code block perspective. The register R8 is updated by the translated code block 302 at time t. The translated code block 304 further updates register R8 as indicated by R8' and R8". The R8' updates the register R8 based on a value of R8 that was valid at time t-1; R8" updates the register R8 value based on the results of instruction n+7 which is part of translated code block 302. The updated R8 resulting from R8' and R8" appears at times t+2 and t+4 during which the translated code block 306 is executing. Thus, multiple copies of register R8 need to be available, to account for delays in the instruction execution process.

Figure 10:
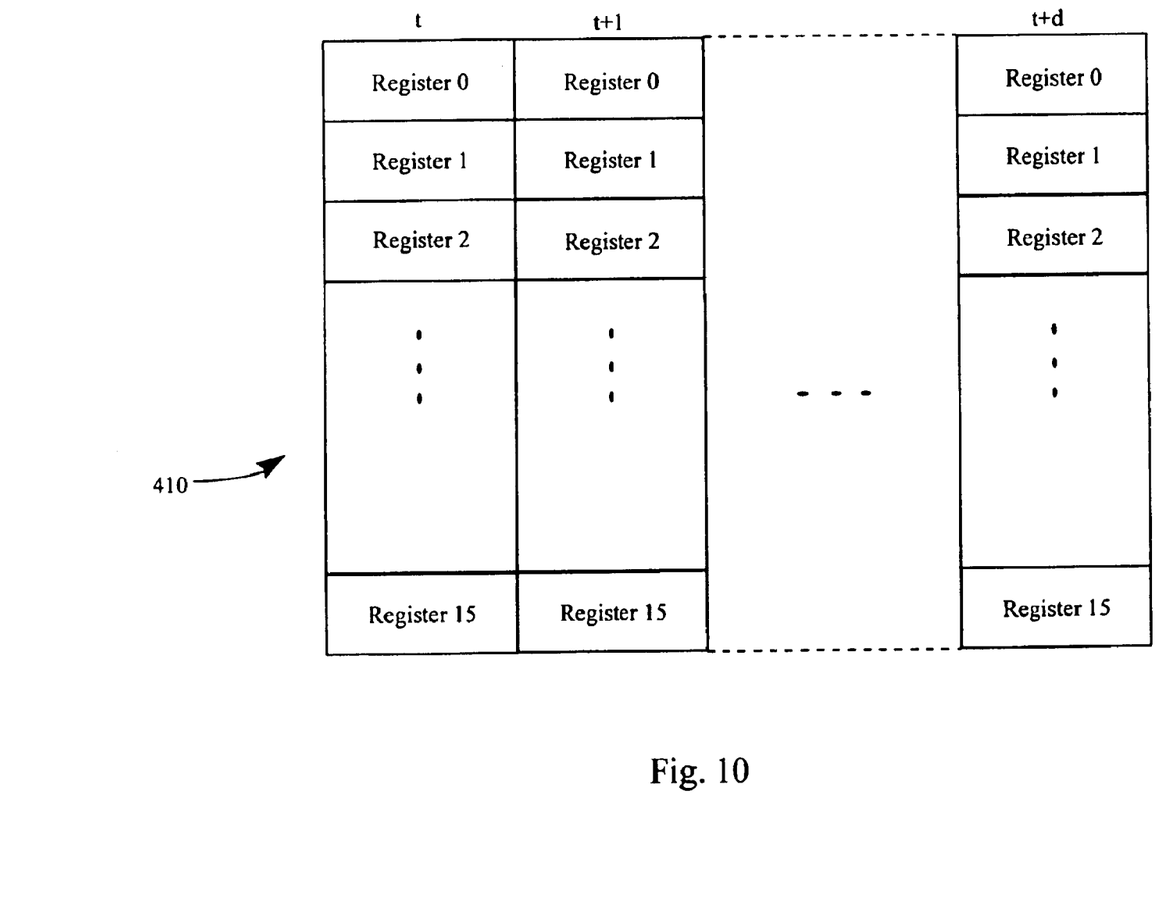
FIG. 10 shows a register that accounts for instruction execution delay time.

FIG. 10 shows an enhanced register map 410 that includes multiple copies of each of the source registers depending on the number of instruction cycles that separates the instruction execution and the time that the register is updated. Assuming that all the instructions required instruction cycles to updated the registers, then the source register map 410 must include d+1 sets of the registers to account for the delay time. If the delay instruction cycles d is 0, then only the register map for time t is required. If one instruction cycle delay is required, then the register map 410 includes memory locations for t and t+1.

The source register map 410 assumes that all instructions require a same number of cycles to update registers. For particular processors, some registers may be updated immediately while other registers may require more instruction cycles. Thus, the number of storage locations for the source register map 410 may be adjusted based on the number of instruction cycle delays that is required for the update of each of the registers.

Figure 11:
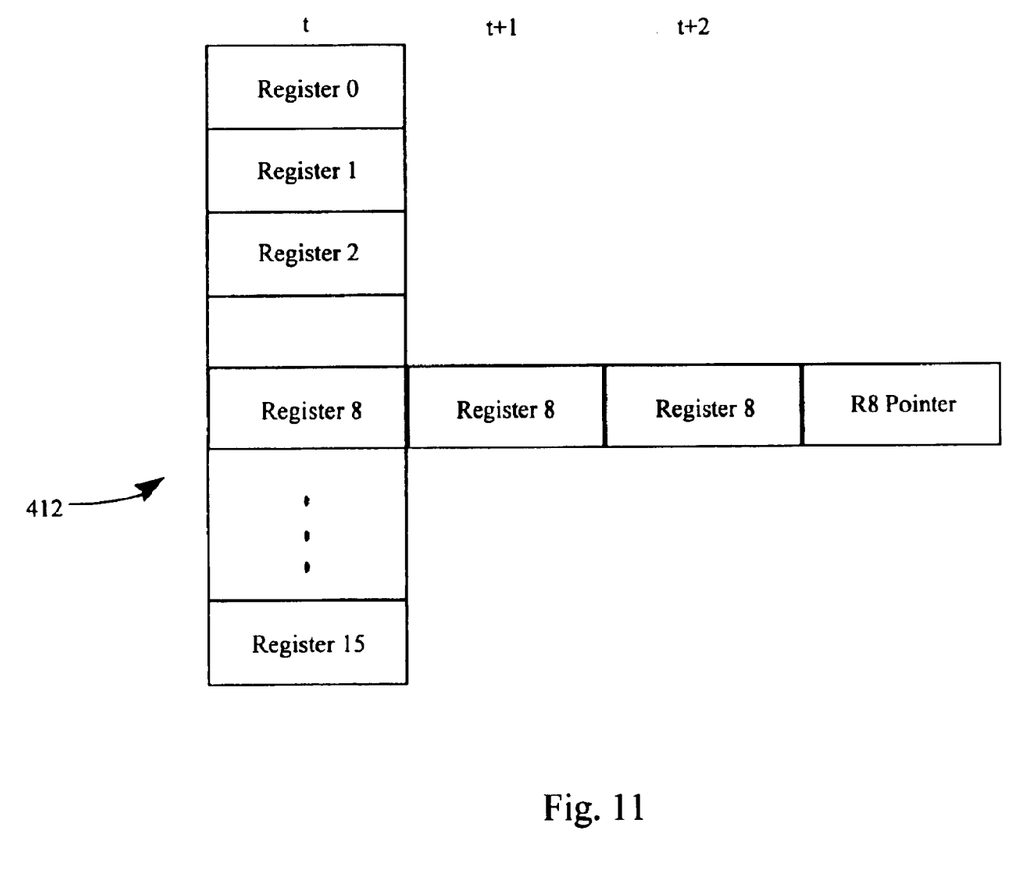
FIG. 11 shows register map contents with delay in instruction execution.

FIG. 11 shows a source register map 412 where only updates of register R8 takes two instruction cycles and all other registers are updated immediately. Thus, the register R8 has three storage locations corresponding to t, t+1 and t+2 while all other registers only have single locations. An R8 pointer location may also be provided to store a value that corresponds to t, t+1 or t+2 to indicate which of the R8 register values is the current value for the register R8.

Figure 12:
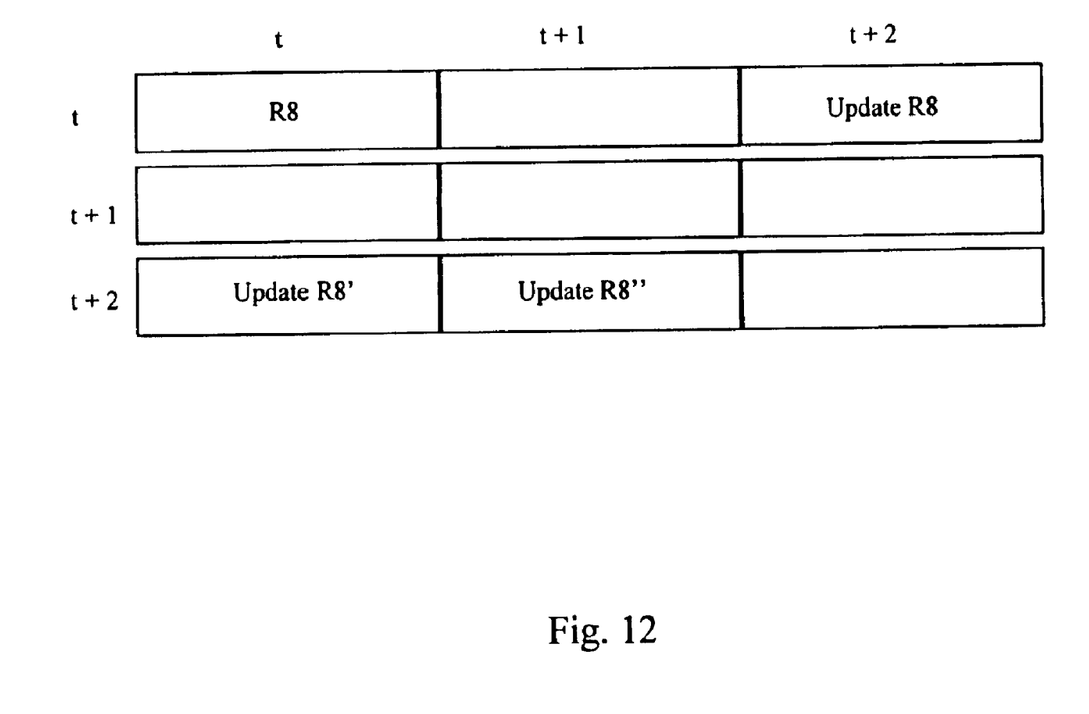
FIG. 12 shows an exemplary diagram of a regular map accounting for delay for only one register.

FIG. 12 shows an example of how the values of the registers may be placed in the source register map 412. For register R8, at the time of instruction n+7 (vertical axis) the tail stub of the translated code block 302 may place the update R8 result in the R8 register at t+2 (horizontal axis) because the instruction n+7 calculates the new value of R8 but due to the instruction delay, the updated R8 will not actually be available in the source processor 102 until the time of instruction n+9. See FIG. 8. Similarly, the tail stub of the translated code block 304 may place the update R8' and update R8" results in the R8 register at t and t+1 (horizontal axis) for the time of instruction n+8 and n+9 (vertical axis), respectively. During execution of the translated code block, the associated pointer may point to one of the register R8 values corresponding to t, t+1 or t+2 as the current value of the register R8.

The above described instruction delay often occurs for data registers of digital signal processors (DSPs), for example. In such processors, pipeline techniques permit efficient use of computational units such as multipliers and accumulators to be performed in stages so that the computational units may begin a computational process every instruction cycle but the computational process may require multiple cycles to complete. Thus, when translating data registers for low level code, source register maps such as register map 410, 412 or equivalent may be used to fully accommodate pipeline delays.

Figure 13:
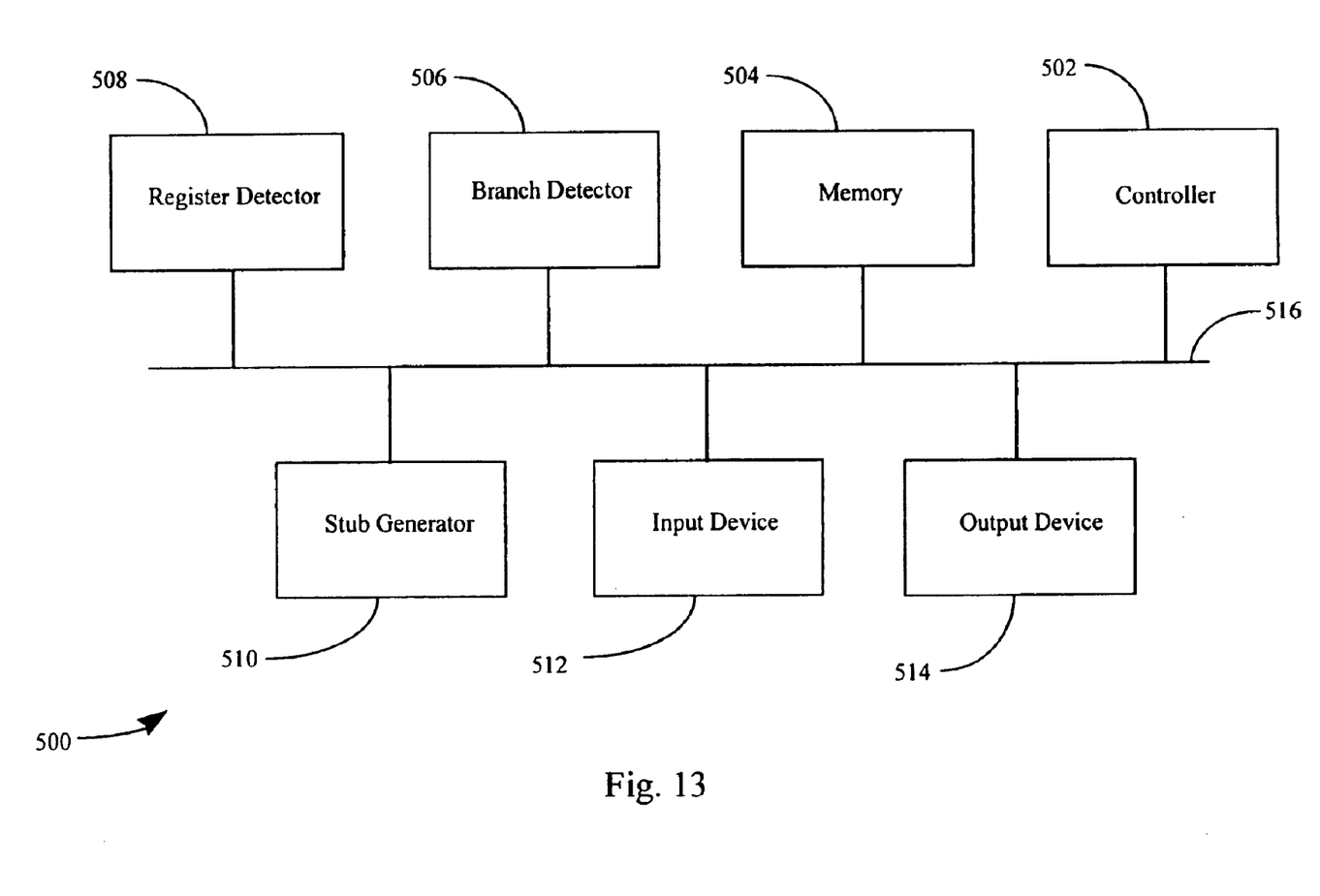
FIG. 13 shows an exemplary block diagram of a code translator processor.

FIG. 13 shows an exemplary block diagram of a processor 500 that may perform the functions of the code translator 110. The processor 500 may include a controller 502, a memory 504, a branch detector 506, a register detector 508, a stub generator 510, an input device 512 and an output device 514. The above components may be coupled together via signal bus 516. While FIG. 9 shows a bus architecture, any type of architecture may be used and implemented using any type of technology such as application specific integrated circuits (ASIC), PLAs, PLDs, etc. as is well known to one of ordinary skill in the art. Also, while FIG. 9 shows separate blocks for the branch detector 506, register detector 508, and stub generator 510, the functions of these blocks 506–510 may also be performed by the controller 502.

When a translation task is initiated, the controller 502 receives the source low level code 106 for the source processor via the input device 506 and stores the source code in the memory 504. The controller 502 then commands the branch detector 506 to identify the source code blocks 202–210 as dictated by the branch and do-loops that are used in the source code 106. After the source code blocks 202–210 are identified, the controller 502 commands the register detector 508 to determine the register usage within each of the source code blocks 202–210 and further subdivides the source code blocks 202–210 into translated code blocks 302–312 based on a number of registers of the target processor 104 that may be used for performing register functions of each type of registers that are used within each block of the source code 106. For example, address registers and data registers may be considered independently because these registers may be used by different units of the source and/or target processors 102 and 104.

After the source code blocks 202–210 are divided into translated code blocks 302–312, the controller 502 generates target code to allocate a register map such as register maps 408, 410 or 412 and command the stub generator 510 to generate head and tail stubs 402 and 406 that correspond to each translated code block 302–312. After all the stubs 402 and 406 are generated, the controller 502 generates translated blocks 400 based on the head and tail stubs 402 and 406, and the translated code blocks 202–210, and outputs the translated blocks 400 through the output device 508 as the translated output.

Figure 14:
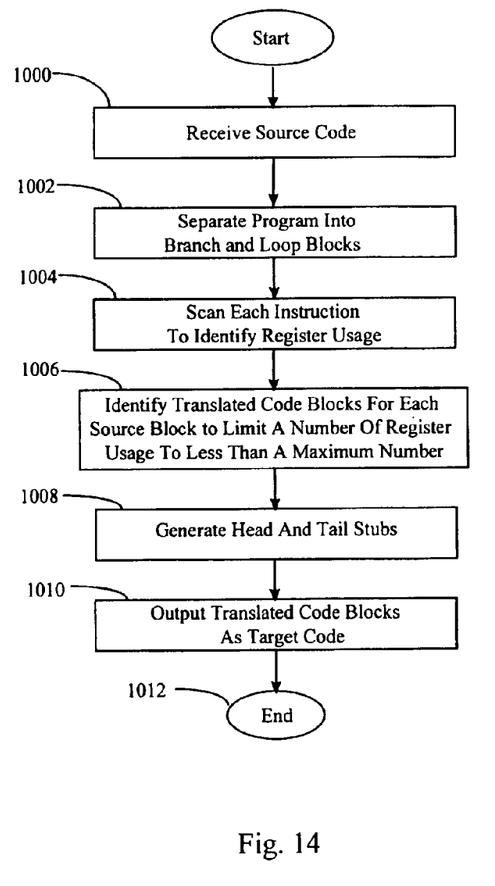
FIG. 14 shows a flowchart of a code translator processor.

FIG. 14 shows a flowchart of an exemplary process of the processor 500. In step 1000, the controller 502 receives the source code 106 and goes to step 1002. In step 1002, the controller 502 commands the branch detector 506 to identify source code blocks based on branch and loop commands of the same code 106 and goes to step 1004. In step 1004, the controller 502 commands the register detector 508 to scan each instruction of each source code block to identify register usage and goes to step 1006.

In step 1006, the controller 502 identifies translated code blocks 302–312 based on a maximum number of registers of the target processor 104 that corresponds to the registers of the source processor 102, and goes to step 1008. In step 1008, the controller 502, commands the stub generator 610 to generate the head and tail stubs 402 and 406 and goes to step 1010. In step 1010, the controller 502 outputs the translated block 400 via the output device 508 and goes to step 1012 and ends the process.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A code translation device that translates a source code into a target code, the device comprising:
    a memory;
    a source processor;
    a target processor; and
    a controller that:
    divides the source code into first source code blocks based on branches and loops in the source code,
    divides the first source code blocks into second source code blocks based on target register capability, wherein: a largest number of source registers required in each second source code block being less than or equal to a maximum number of target registers that correspond to the source registers, and
    converts each of the second source code blocks directly into a corresponding target code block;
    wherein the controller identifies source register types as data registers or address registers of the source processor and corresponding target registers of the target processor that correspond to each of the source register types,
    selects one or more identified source register types and one or more maximum numbers of corresponding target registers that correspond to the selected source register types, and
    generates a source register map having a number of storage locations based on a number of instruction cycles required to update a source register.

2. The device of claim 1, further comprising a branch detector, the branch detector identifying one or more instructions of the source code that either includes a branch, a loop return or an entry point for a branch or loop return.

3. The device of claim 2, wherein the controller generates the first source code blocks based on the identified instructions, each of the first source code blocks beginning immediately after an identified instruction and includes all consecutive instructions following the identified instruction up to an instruction immediately before a next identified instruction.

4. The device of claim 3, further comprising a register detector, the register detector detecting a number of source registers that are used and/or updated in one or more instructions of each of the source code blocks.

5. The device of claim 4, wherein the controller generates one or more translated code blocks for each of the source code blocks based on a number of selected source registers detected by the register detector and the maximum numbers of corresponding target registers.

6. The device of claim 5, further comprising a stub generator, the stub generator generating a head stub and a tail stub for each of the translated code blocks.

7. The device of claim 6, wherein a head stub associated with a translated code block initialize one or more target registers used by the associated translated code block, the target registers being initialized by retrieving register values from the source register map that stores values of the source registers during execution of the translated code blocks.

8. The device of claim 6, wherein a tail stub associated with a translated code block saves values of one or more target registers used by the associated translated code block in the source register map after execution of the translated code blocks.

9. The device of claim 8, wherein the tail stub saves values of the target registers in one or more appropriate locations in the source register map to account for the instruction execution delays.

10. A method for translating a source code of a source processor into a target code of a target processor, the method comprising:
    identifying a target processor register capability;
    dividing the source code into first source code blocks based on branches and loops in the source code,
    subdividing the first source code blocks into second source code blocks based on target resister capability, wherein: a largest number of source registers required in each second source code block being less than or equal to a maximum number of target registers that correspond to the source registers,
    converting each of the second source code blocks directly into a corresponding target code block;
    identifying source register types as data registers or address registers of the source processor and corresponding target registers of the target processor that correspond to each of the source register types;
    selecting one or more identified source register types and one or more maximum numbers of corresponding target registers that correspond to the selected source register types; and
    generating a source register map having a number of storage locations based on a number of instruction cycles required to update a source register.

11. The method of claim 10, further comprising identifying one or more instructions of the source code that include a branch, a loop return or an entry point for a branch or loop return.

12. The method of claim 11, further comprising generating the first source code blocks based on the identified instructions, each of the first source code blocks beginning immediately after an identified instruction and includes all consecutive instructions following the identified instruction up to an instruction immediately before a next identified instruction.

13. The method of claim 12, further comprising detecting a number of source registers that are used and/or dated in one or more instructions of each of the source code blocks.

14. The method of claim 13, further comprising generating one or more translated code blocks for each of the source code blocks based on a number of selected source registers and the maximum numbers of corresponding target registers.

15. The method of claim 14, further comprising generating a head stub and a tail stub for each of the translated code blocks.

16. The method of claim 15, wherein a head stub associated with a translated code block initializes one or more target registers used by the associated translated code block, the target registers being initialized by retrieving register values from the source register map that stores values of the source registers during execution of the translated code blocks.

17. The method of claim 15, wherein a tail stub associated with a translated code block saves values of one or more target registers used by the associated translated code block in the source register map after execution of the translated code block.

18. The method of claim 17, wherein the tail stub saves values of the target registers in one or more appropriate locations in the source register map to account for the instruction execution delays.

\* \* \* \* \*